(12) United States Patent
Cheng

(10) Patent No.: US 8,849,014 B2
(45) Date of Patent: Sep. 30, 2014

(54) PHOTOGRAPHIC SYSTEM

(75) Inventor: Chia-Ming Cheng, Hsinchu (TW)

(73) Assignee: Mediatek Inc., Hsin-Chu (TW)

( * ) Notice: Subject to any disclaimer, the term of this patent is extended or adjusted under 35 U.S.C. 154(b) by 244 days.

(21) Appl. No.: 13/225,682

(22) Filed: Sep. 6, 2011

(65) Prior Publication Data

US 2013/0058561 A1 Mar. 7, 2013

(51) Int. Cl.
- G06K 9/00 (2006.01)
- G06K 9/62 (2006.01)
- G06K 9/32 (2006.01)
- G06T 15/20 (2011.01)
- G06K 9/60 (2006.01)
- G06T 17/00 (2006.01)
- H04N 13/00 (2006.01)

(52) U.S. Cl.
CPC . *G06K 9/60* (2013.01); *G06T 15/20* (2013.01); *G06T 17/00* (2013.01); *H04N 13/0011* (2013.01)

USPC ............ 382/154; 382/209; 382/293

(58) Field of Classification Search
None
See application file for complete search history.

(56) References Cited

U.S. PATENT DOCUMENTS

| | | | |
|---|---|---|---|
| 8,218,854 B2 * | 7/2012 | Liu et al. | 382/154 |
| 2009/0278958 A1 * | 11/2009 | Bregman-Amitai et al. | 348/231.99 |
| 2011/0001792 A1 * | 1/2011 | Pandit et al. | 348/43 |

* cited by examiner

Primary Examiner — Bhavesh Mehta
Assistant Examiner — David F Dunphy
(74) Attorney, Agent, or Firm — McClure, Qualey & Rodack, LLP

(57) ABSTRACT

A photographic system for generating photos is provided. The photographic system comprises a photo composition unit, and a photo synthesizer. The photo composition unit is capable of determining an extracted view from a three dimensional (3D) scene. The photo synthesizer, coupled to the photo composition unit, is capable of synthesizing an output photo according to the extracted view.

21 Claims, 5 Drawing Sheets

PHOTOGRAPHIC SYSTEM

BACKGROUND OF THE INVENTION

1. Field of the Invention

The present invention relates to photographic system, and in particular relates to photographic system for generating photos according to extracted view.

2. Description of the Related Art

In conventional photography, the photographer has to take a photo by selecting a viewing angle, viewing position and lenses of a camera, which are aesthetically crucial for expert photo taking. Composition of a photo at a particular location is done by changing the direction and angle of the camera and altering zoom control. Expert photographers may carefully compose a photo, by taking their time and focusing their attention, when taking photos. However, various rules of expert photo compositions are difficult to learn for the amateur photographer. Consequently, amateur photographers most likely do not know how to perform the various rules for photo compositions as well as expert photographers when taking photos. For example, amateur photographers may use a digital camera with one simple camera lens having a limited optical zoom control function. As a result, photos from amateur photographers may not have the features as those from expert photographers, such as wide/short angle effects.

Cheatle (U.S. Pat. No. 7,133,571 B2) discloses an electronic image processor for cropping an electronic image. The image processor incorporates a region based saliency classification technique with a face detector and region of an interest detector to crop a desired image region from the electronic image. The disclosed method is performed with the following steps. First, the salient region is detected in an image. Certain regions may be denoted as more salient than others by allocating a high salience designation to regions on the basis of some combinations: i) relative unusualness of the color, intensity or texture of the region to other adjacent regions; and/or ii) relative unusualness of the color, intensity or texture of the region relative to a substantial portion of the image. A decision may be made by an image processor as to how likely the region is to be a person's face, head or whole body, or how likely the region is to be a person or how central the region is in the image. Second, rules for the identification and elimination of distractions are applied at the edge of the images when forming the maximum cropping limits. Third, rules for identifying different combinations of a subject are applied for alternative compositions. Fourth, edge quality metrics are generated, including rules for selecting locations appropriate for provision of the cropping edge locations. At last, a weighted sum combination of crop quality metrics is formed and rules for comparatively assessing alternative possible output crops are implemented.

However, the prior works are limited to measuring the information of a 2D photo and cropping. They lost the depths in the captured photo and no longer consider the geometry information in real 3D world.

BRIEF SUMMARY OF THE INVENTION

In view of the above, the invention provides a photographic system for generating photos, comprising: a photo composition unit capable of determining an extracted view from a three dimensional (3D) scene; and a photo synthesizer, coupled to the photo composition unit, capable of synthesizing an output photo according to the extracted view.

The invention further provides a method for generating photos, comprising: determining an extracted view from a three dimensional (3D) scene; and synthesizing an output photo according to the extracted view.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
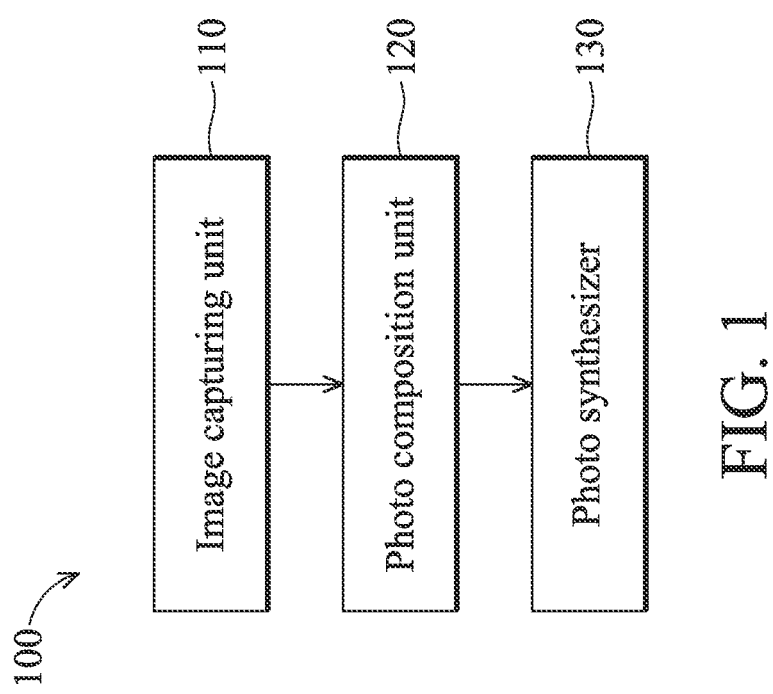
FIG. 1 illustrates the functional block diagram of the photographic system according to an embodiment of the invention.

The present invention discloses a photographic system for generating photos. FIG. 1 illustrates the functional block diagram of the photographic system according to an embodiment of the invention. The photographic system 100 comprises an image capturing unit 110, a photo composition unit 120, and a photo synthesizer 130. It should be noted that some of the units, such as image capturing unit 110, in the photographic system 100 can be omitted or replaced. Any unit, either part of the photographic system 100 or not, can provide input images to the photo composition unit 120 is suitable. The image capturing unit 110 is used for capturing images image sequences and/or video sequences and/or obtaining internet images (i.e. images from the internet) to provide input images to the photo composition unit 120. The image capturing unit 110 can further receive image data of a 3D scene. In some embodiments of the invention, the image capturing unit 110 can be digital cameras, video recorders, mobile or handheld devices with a camera, but are not limited thereto. The photo composition unit 120 is capable of building a 3D scene according to the input images from the image capturing unit 110 or any other sources capable of providing input images, and determining an extracted view from the 3D scene. In this embodiment, the photo composition unit 120 is capable of determining the extracted view according to at least one photographic composition rule, at least one exemplar parameter or a combination thereof. The photo synthesizer 130 is capable of synthesizing an output photo according to the extracted view. In this embodiment, the photo synthesizer 130 is capable of synthesizing the output photo further according to user settings, information of the 3D scene or a combination thereof.

Figure 2:
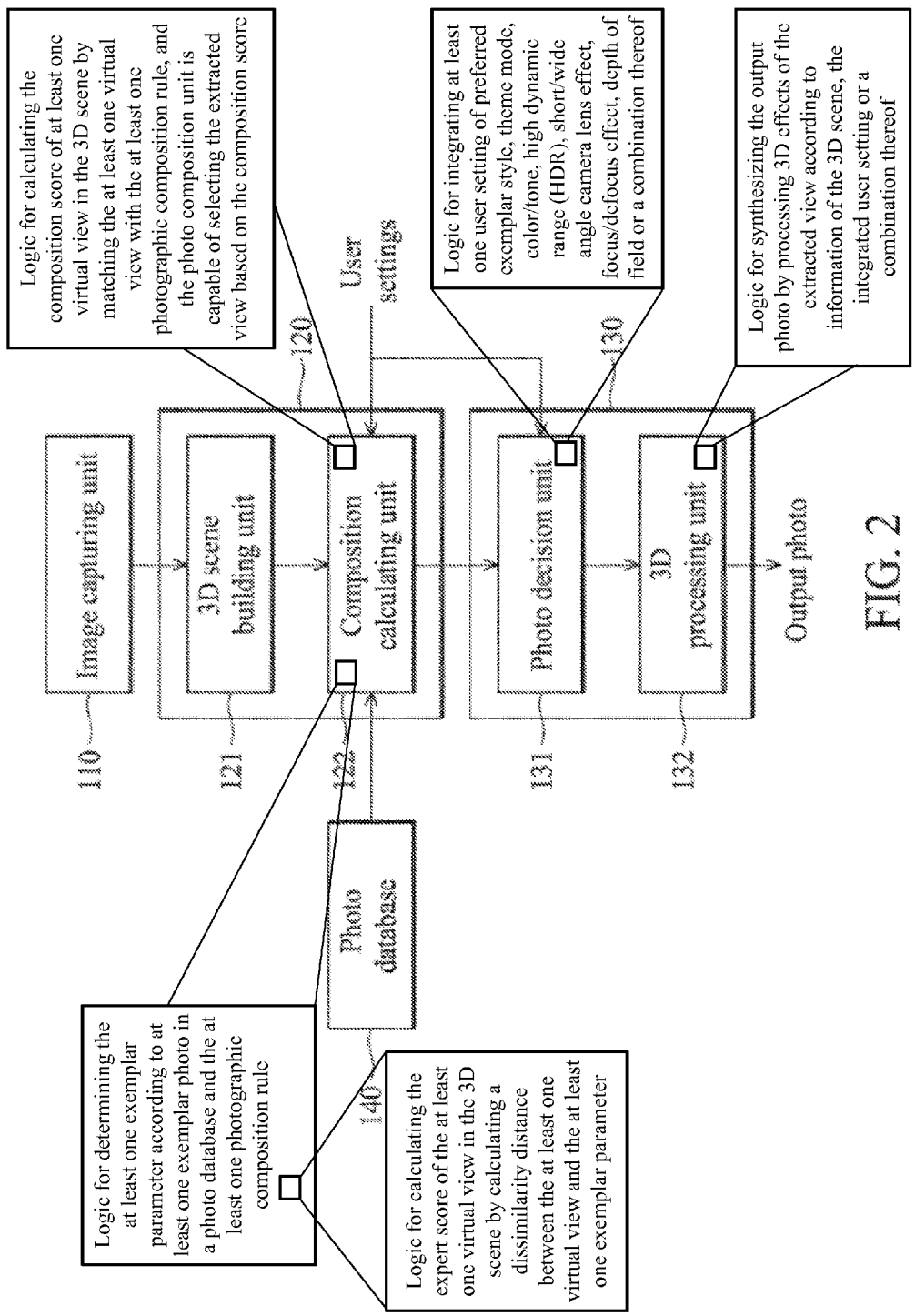
FIG. 2 illustrates the detailed block diagram of the photographic system according to an embodiment of the invention.

FIG. 2 illustrates the detailed block diagram of the photographic system according to an embodiment of the invention. The photo composition unit 120, coupled to the image capturing unit 110, may include a 3D scene building unit 121 and a composition calculating unit 122. The composition calculating unit 122 is capable of storing at least one photographic composition rule. The photographic composition rules can be various mathematically measurable rules for aesthetic photo composition, such as rule of thirds, diagonal dominance (leading lines), visual balance, horizontal lines, relative scale, layering, repeating patterns, etc. to provide quantitative objective measurements, but the invention is not limited thereto. For example, the "rule of thirds" is to divide the scene from a camera into nine equal blocks by spaced horizontal lines and two vertical lines. The four intersections formed by these lines are referred to as the "power points", and photographers are encouraged to place the main subjects around these points instead of the center of the image. Also by this composition rule, strong vertical and horizontal components or lines in the image should be aligned with those lines. As for "diagonal dominance", photographers are encouraged to place the main subjects along the diagonals of the image which are aesthetically significant. One of the most common and effective use for "diagonal dominance" is for a leading line—a line that causes the eyes of the viewers to fixate on the subjects along it. The concept of "visual balance" is also a crucial component for the harmony of image composition. In a visually balanced image, visually salient objects are distributed evenly around a center. When an image is visually balanced, the "visual mass" is nearby the center of the image, and this mass takes into account both the area and the degree of saliency of visually salient regions. When an input image complies with most of the photographic composition rules, it indicates that the input image potentially has a better aesthetic photo composition. However, in practice, some composition rules are of opposing conditions and may conflict with one another. That is, some composition rules may take the global feature of an image into account, while some other composition rules may only search for a locally optimized feature. For example, when a salient object in an image complies with the composition rule of "visual balance", it does not necessarily comply with the composition rule of "rule of thirds" or "diagonal dominance".

In a training phase, the composition calculating unit 122 is capable of determining at least one exemplar parameter according to information stored in a photo database 140 together with the photographic composition rules. The information stored in the photo database 140 may contain, but not limited to, at least one exemplar photo or artistic works of different photographers, such as expert photographers, for subjective analysis. The subjective analysis may involve various spatial composition information and color/tone information. The composition calculating unit 122 is capable of retrieving the information stored in the photo database 140 and the photographic composition rules to "train" at least one exemplar parameter, such as exemplar parameters of spatial and/or color features. For example, the photographic composition rules and the subjective analysis of the exemplar photo can help determine exemplar parameters of an "expert-like" photo. The exemplar parameters can be used later in determining an extracted view from a three dimensional (3D) scene and the photo synthesizer 130. The composition calculating unit 122 is further capable of storing the exemplar parameters for future calculations.

The 3D scene building unit 121 is for building a 3D scene according to the input images from the image capturing unit 110 or any other sources. In an embodiment of the invention, building of the 3D scene can be based on multi-view image geometry techniques as introduced in "Multiple View Geometry in Computer Vision" by R. I. Hartley, A. Zisserman, Cambridge University Press (2004). The 3D scene building unit 121, using multi-view image geometry techniques, allows building of a 3D scene instead of a 2D panorama from the input images. In order to build a 3D scene, at least two different images of a scene are required. First, for example, the image capturing unit 110 can capture an image sequence with motion in a horizontal direction and/or vertical direction. Second, the 3D scene building unit 121 can derive point or line features from the image sequence. That is, the 3D scene building unit 121 builds 3D point locations up to the projective ambiguity in a fundamental matrix from point correspondences and computes camera matrices from the fundamental matrix. Further, by the 3D scene building unit 121, the 3D points can be built from the point correspondences. As a result, the 3D scene is built by projection of the 3D points. The geometry information of the 3D scene helps the composition calculating unit 122 determine the viewing position, viewing angle and camera lens for an expert-like output photo, which are also important camera parameters or photography feature factors.

The term "extracted view" can represent a virtual view of a camera in the 3D scene with at least one of camera parameters including (1) 3D rotation/translation for a specific relative location and viewing direction of the camera in the 3D scene, or (2) the focal lens, principle points, skew factors, and lens distortion for camera intrinsic parameters of the camera or a combination thereof, wherein the 3D scene can be built from the input image/video sequences according to the at least one photographic composition rule.

In the determining phase, the composition calculating unit 122 can be regarded as a scoring machine which evaluates the "scores" of different photo compositions or sampling positions of the built 3D scene according to, for example, the photographic composition rules, exemplar photos, user settings or a combination thereof. The composition calculating unit 122 can formulate the "score-evaluating" problem as an optimization problem. In one embodiment, user settings may include theme mode settings, color/tone settings, high dynamic range (HDR) settings and depth-of-field settings etc., but are not limited thereto.

Figure 3A:
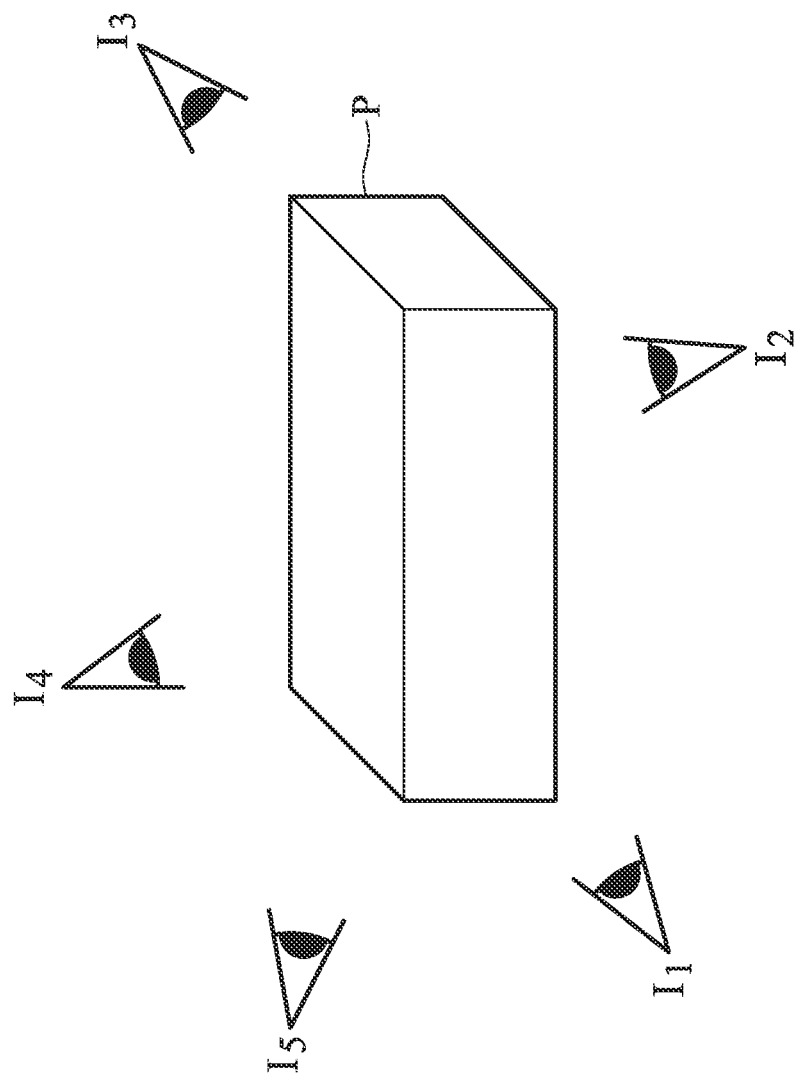
FIG. 3A illustrates the built 3D scene according to an embodiment of the invention.
Figure 3B:
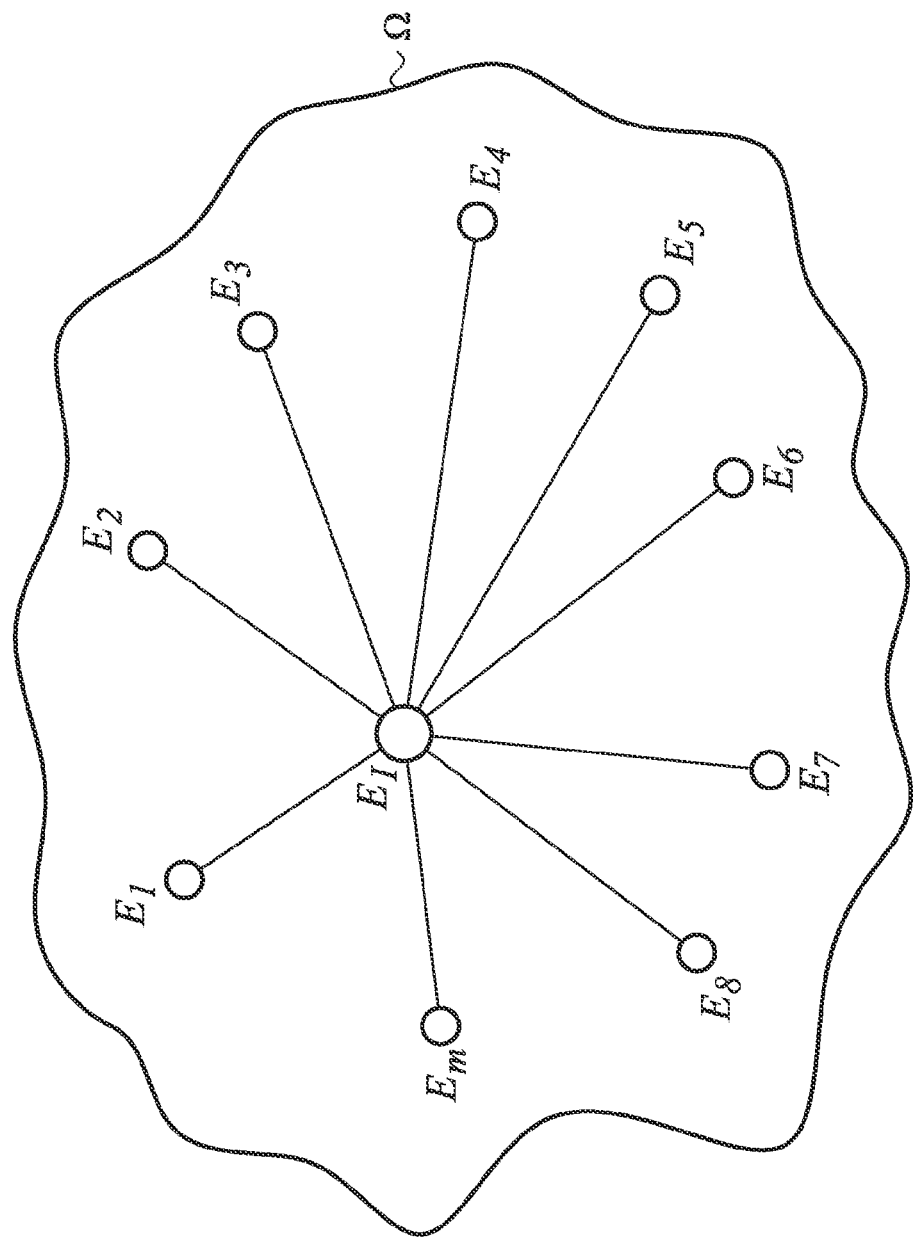
FIG. 3B illustrates relationship between the extracted view and the set of exemplars according to an embodiment of the invention.

FIG. 3A illustrates the built 3D scene according to an embodiment of the invention. FIG. 3B illustrates relationship between the extracted view and the set of exemplars according to an embodiment of the invention. According to the exemplars, the photo composition rules, the user settings, or a combination thereof, the built 3D scene can be regarded as an exemplar photo collection set $\Omega$ of various nodes $E_n$ (e.g. n=1~m), as illustrated in FIG. 3B. Each node $E_n$ (e.g. n=1~m) in the set $\Omega$ can represent a style of an expert photographer. There are various parameters to represent information of a 3D space. According to an embodiment of present invention, in the determining phase, the composition calculating unit 122 can simplify the parameters in a 3D scene to be several photography feature factors in order to evaluate the 3D scene efficiently. With 3D geometry information of the built 3D scene, depth images can be obtained. That is, the camera can move in a Z axis (depth), in addition to an X (horizontal) axis and a Y (vertical) axis. In an embodiment of the invention, for example, $I(P;z,s,d,r)$ represents a sample or an extracted view of a camera of the built 3D scene, where P represents a set of a full view of the built 3D scene, z represents the center (position) of the camera, s represents the size of the camera, d represents the depth of the camera, and r represents the rotation angle of the camera, but the invention is not limited thereto. To solve the optimization problem, a dissimilarity measure between an extracted view of P and at least one node $E_n$ (e.g. n=1~m) in the set of expert styles is performed, which can be represented in the formula as follows:

$$\{z^*, s^*, d^*, r^*, E^*\} = \underset{\substack{z,s,d,r \\ E \in \Omega}}{\arg\min} \rho(I(P; z, d, s, r), E_n)$$

wherein $\Omega$ represents a set of expert styles, $E_n$ (e.g. n=1~m) represents a node (an expert style) in the set $\Omega$, and $\rho$ is the dissimilarity measure score for each node $E_n$ (e.g. n=1~m). As illustrated in FIG. 3A, assume that the built 3D scene P is built from the extracted view $I_1$ and $I_2$. Then, after the full 3D scene P is built, other views, such as $I_3$, $I_4$, and $I_5$, can be extracted from different locations and angles.

To measure the dissimilarity between an extracted view I and at least one of the nodes $E_n$ (e.g. n=1~m) of expert styles, the composition calculating unit 122 can evaluate the distance between the node $E_1$ of the extracted view I and the at least one node $E_n$ (e.g. n=1~m), as illustrated in FIG. 3B, and gives the extracted view I an "expert score". If the distance between the node $E_1$ of the extracted view I and a node $E_n$ (e.g. n=1~m) is shorter, a higher expert score will be given. A higher expert score indicates lower dissimilarity and higher priority. Therefore, the composition calculating unit 122 can calculate and summarize the expert scores of at least one extracted view and recommend one extracted view of the built 3D scene, which can be the one closest in distance to a certain expert style (node $E_n$) in the set $\Omega$, but is not limited thereto. For example, $I_1, I_2, \ldots, I_n$ represent N different extracted views in the built 3D scene. $E_1, E_2, \ldots, E_m$, represent M candidate nodes in the set $\Omega$. As a result, there are N*M calculated expert scores in the built 3D scene and the composition calculating unit 122 may select the extracted view with the highest expert score. If two or more extracted views have the same highest expert score, one of them can be chosen according to user settings. In another embodiment of the invention, the user may select one of his/her favorite expert styles in advance. Then, the composition calculating unit 122 may only preserve specific nodes E corresponding to the selected expert style in the set $\Omega$ for calculation.

The composition calculating unit 122 can further evaluate a "composition score" for at least one extracted view according to at least one photographic composition rule. For example, the composition calculating unit 122 can set a composition score for each photographic composition rule. When the extracted view matches a certain photographic composition rule, the extracted view gets the composition score for the photographic composition rule. After matching the extracted view with, for example, each photographic composition rule, the composition calculating unit 122 can sum up the scores to get the accumulated composition score for the extracted view. A higher composition score may indicate that the extracted view mathematically has a better aesthetic photo composition in the quantitative measure. Each extracted view of the 3D built scene can have its own composition score and the composition calculating unit 122 can summarize and recommend one extracted view according to the composition scores. The composition scores corresponding to the photographic composition rules can be the same or different. For example, the composition scores corresponding to each of n photographic composition rules can all be a. Then an extracted view matches m of the n photographic composition rules would have a composition score S=m*a. In another example, the composition calculating unit 122 may set different composition scores for the composition rules. For example, the composition score corresponding to the "rule of thirds" can be $a_1$, and the composition score corresponding to "diagonal dominance" can be $a_2$, the composition score corresponding to "visual balance" can be $a_3$. Then an extracted view matching rule of thirds and visual balance will get an accumulated composition score S=$a_1$+$a_3$.

The photo synthesizer 130 is coupled to the photo composition unit 120. In one embodiment, the photo synthesizer 130 can synthesize and output an output photo according to the recommended extracted view of the built 3D scene from the composition calculating unit 122. The photo synthesizer 130 may include a photo decision unit 131 and a 3D processing unit 132. The photo decision unit 131 may further operate according to the user settings of, for example, preferred expert exemplar style, color/tone, high dynamic range, short/wide angle camera lens effect, focus/defocus effect, depth of field, etc. The color/tone settings may include various themes to represent different color styles. In one embodiment, the image capturing unit 110, such as a digital camera, may provide styles of different expert photographers and color/tone adjustment settings. If the user chooses a favorable expert style A and color/tone setting B (or theme mode B), the photo synthesizer 130 can synthesize the output photo with settings A and B. In one embodiment, because there might be more than one extracted view with a highest expert score and/or composition score, the photo decision unit 131 can further determine the extracted view of the built 3D scene to be sent to the 3D processing unit 132.

The 3D processing unit 132 can synthesize an output photo according to the settings from the photo decision unit 131. Some photo effects require 3D information of the scene, such as depth of field, texture laying, reflection, focus/defocus effect, short/wide angle lens effect, lighting effect, etc. For example, if the 3D effects are processed with information of a 3D scene, the output photos could be closer to the real world. That is, the 3D processing unit 132 may further synthesize the output photos by processing the 3D effects of the extracted view (e.g. 3D computational photography) according to information of the built 3D scene, the integrated settings, or a combination thereof. Despite the 3D effects in a 3D scene, the 3D processing unit 132 can also perform conventional 2D image processing with information from the built 3D scene reconstructed from the input image/video sequences.

In another embodiment, the image capturing unit 110 may capture an image sequence and the 3D scene building unit 121 may build the 3D scene according to the image sequence. The composition calculating unit 122 can calculate the photo viewing position, angle, and camera lens for the 3D scene, for example, concurrently. The information of the photo viewing position, angle and camera lens can be determined after calculating the dissimilarity between at least one node of the aforementioned set of exemplars and photographic composition rules. The recommended camera position/angle is chosen from various camera positions of the built 3D scene, which may or may not be the same as that of the position/angle of input images from the image capturing unit 110. In one embodiment, besides synthesizing output photo according to the recommended camera position/angle, the composition calculating unit 122 can give feedback or recommendation to the user. Then, the user can alternate the position and/or the angle of the digital camera or the image capturing unit 110 to obtain more "expert-like" photos. The user may also know that if they choose a recommended theme mode and/or color/tone adjustment settings, the output photos of the photo synthesizer 130 can be close to a certain expert photographer's style. In another embodiment, one of the expert exemplar styles or a theme mode of photos can be alternatively incorporated into the photo composition unit 120 in advance. The composition calculating unit 122 would then only calculate the nodes in the set Ω with the aforementioned constraints.

In also another embodiment, if the recommended extracted view from the photo composition unit 120 is substantially the same as that of one of the input images, the photo synthesizer 130 can refine this input image rather than synthesize a new output photo. In one embodiment of the invention, with the support of an appropriate multi-view display, the photo synthesizer 130 can further output the entire built 3D scene without two dimensional (2D) to 3D or 3D to 2D transformations.

Figure 4:
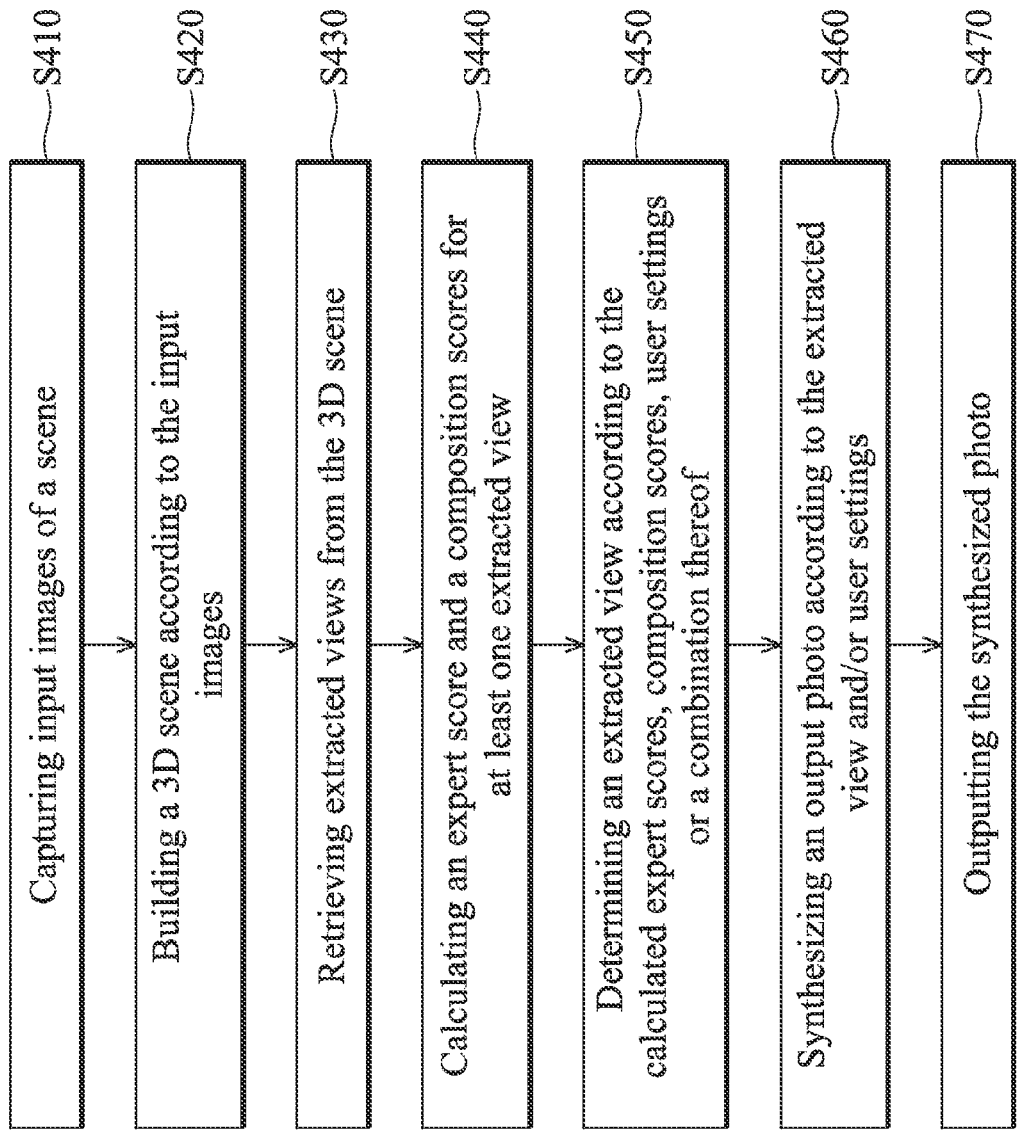
FIG. 4 illustrates the flowchart of the determining phase according to an embodiment of the invention.

FIG. 4 illustrates the flowchart of the determining phase according to an embodiment of the invention. First, in step S410, the image capturing unit 111 can capture input images of a scene. Second, in step S420, the 3D scene building unit 121 can build the 3D scene according to the input images. Third, in step S430, the composition calculating unit 122 can retrieve at least one extracted view from the 3D scene. Further, in step S440, the composition calculating unit 122 can calculate the expert score and composition score for the at least one extracted view. Moreover, in step S450, the composition calculating unit 122 can determine an extracted view according to the calculated expert scores, composition scores, user settings or a combination thereof. In addition, in step S460, the photo synthesizer 130 can synthesize an output photo according to the extracted view and/or user settings. In step 470, the photo synthesizer 130 can output the synthesized output photo. It should be noted that the order of the steps shown in FIG. 4 is illustrative only. Besides, some of the steps shown in FIG. 4 can be omitted.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A photographic system for generating photos, comprising:
    a photo composition unit capable of selecting an extracted view from a plurality of virtual views in a three dimensional (3D) scene; and
    a photo synthesizer, coupled to the photo composition unit, capable of synthesizing an output photo according to the extracted view;
    wherein, the 3D scene is a 3D virtual space based on at least two input images;
    wherein the photo composition unit is further capable of selecting the extracted view according to at least one photographic composition rule, at least one exemplar parameter, or a combination thereof.

2. The photographic system as claimed in claim 1, wherein the photo composition unit comprises a 3D scene building unit capable of building the 3D scene according to at least two input images.

3. The photographic system as claimed in claim 1, wherein the photo composition unit comprises a composition calculating unit capable of determining the at least one exemplar parameter according to at least one exemplar photo in a photo database and the at least one photographic composition rule.

4. The photographic system as claimed in claim 3, wherein the composition calculating unit is further capable of selecting the extracted view by calculating an expert score for at least one virtual view in the 3D scene.

5. The photographic system as claimed in claim 4, wherein the virtual view from the 3D scene represents a virtual view of a camera in the 3D scene with at least one camera parameters including 3D rotation/translation for a specific relative location and viewing direction of a camera in the 3D scene, or a focal lens, principle points, skew factors, lens distortion for camera intrinsic parameters of the camera or a combination thereof.

6. The photographic system as claimed in claim 4, wherein the composition calculating unit calculates the expert score of the at least one virtual view in the 3D scene by calculating a dissimilarity distance between the at least one virtual view and the at least one exemplar parameter.

7. The photographic system as claimed in claim 4, wherein the photo synthesizer comprises a photo decision unit capable of integrating at least one user setting of preferred exemplar style, theme mode, color/tone, high dynamic range (HDR), short/wide angle camera lens effect, focus/defocus effect, depth of field or a combination thereof.

8. The photographic system as claimed in claim 7, wherein the photo synthesizer further comprises a 3D processing unit capable of synthesizing the output photo by processing 3D effects of the extracted view according to information of the 3D scene, the integrated user setting or a combination thereof.

9. The photographic system as claimed in claim 1, wherein the photo composition unit comprises a composition calculating unit, the composition calculating unit calculates the composition score of at least one virtual view in the 3D scene by matching the at least one virtual view with the at least one photographic composition rule, and the photo composition unit is capable of selecting the extracted view based on the composition score.

10. The photographic system as claimed in claim 1, wherein the at least one photographic composition rule comprises rule of thirds, diagonal dominance, visual balance, horizontal lines, relative scales, repeating patterns, layering or a combination thereof.

11. A method for generating photos, comprising:
    selecting an extracted view from a plurality of virtual views in a three dimensional (3D) scene according to at least one photographic composition rule, at least one exemplar parameter, or a combination thereof; and
    synthesizing an output photo according to the extracted view;
    wherein, the 3D scene is a 3D virtual space based on at least two input images.

12. The method as claimed in claim 11, further comprising: building the 3D scene according to at least two input images.

13. The method as claimed in claim 11, further comprising: determining the at least one exemplar parameter according to at least one exemplar photo in a photo database and the at least one photographic composition rule.

14. The method as claimed in claim 13, further comprising: selecting the extracted view by calculating an expert score and a composition score for at least one virtual view in the 3D scene.

15. The method as claimed in claim 14, wherein the virtual view from the 3D scene represents a virtual view of a camera in the 3D scene with at least one camera parameters including 3D rotation/translation for a specific relative location and viewing direction of a camera in the 3D scene, or a focal lens, principle points, skew factors, lens distortion for camera intrinsic parameters of the camera or a combination thereof.

16. The method as claimed in claim 14, further comprising: calculating the expert score of the at least one virtual view in the 3D scene by calculating a dissimilarity distance between the at least one virtual view and the at least one exemplar parameter.

17. The method as claimed in claim 14, further comprising: calculating the composition score of the at least one virtual view in the 3D scene by matching the at least one virtual view with the at least one photographic composition rule.

18. The method as claimed in claim 11, wherein the at least one photographic composition rule comprises rule of thirds, diagonal dominance, visual balance, horizontal lines, relative scales, repeating patterns, layering or a combination thereof.

19. The method as claimed in claim 11, further comprising: integrating at least one user setting of preferred exemplar style, theme mode, color/tone, high dynamic range, short/wide angle camera lens effect, focus/defocus effect, depth of field or a combination thereof.

20. The method as claimed in claim 19, further comprising: synthesizing the output photo by processing 3D effects of the extracted view according to information of the 3D scene, the integrated user settings or a combination thereof.

21. A photographic system for generating photos, comprising:
- a photo composition unit capable of selecting an extracted view from a plurality of virtual views in a three dimensional (3D) scene according to at least one exemplar parameter; and
- a photo synthesizer, coupled to the photo composition unit, capable of synthesizing an output photo according to the extracted view;
- wherein, the 3D scene is a 3D virtual space based on at least two input images, and the at least one exemplar parameter does not correspond to the at least two input images, and the extracted view is a virtual view of a camera; the photo composition unit comprises a composition calculating unit capable of determining the at least one exemplar parameter according to at least one exemplar photo in a photo database and the at least one photographic composition rule.

* * * * *